Nov. 25, 1958     J. J. ZOBER     2,862,168
AUTOMATIC RUDDER CONTROL FOR AIRCRAFT SEA CRAFT AND THE LIKE
Filed Feb. 1, 1955
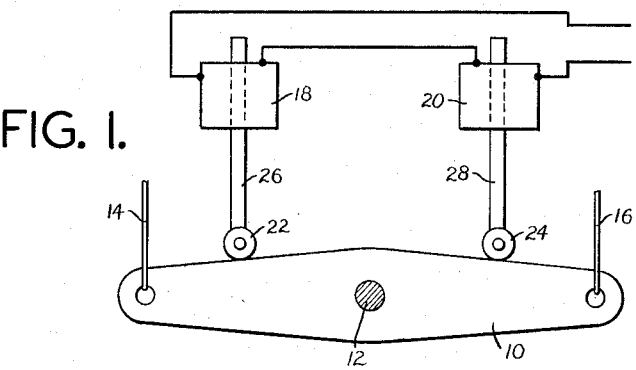
FIG. 1.
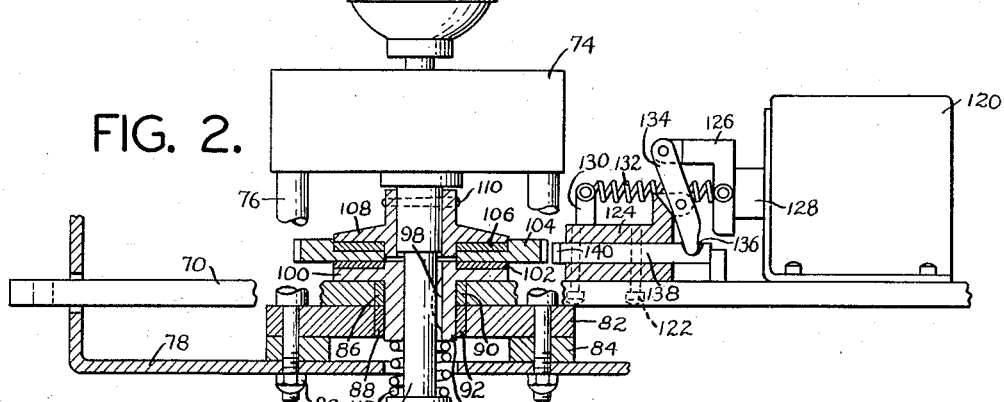
FIG. 2.
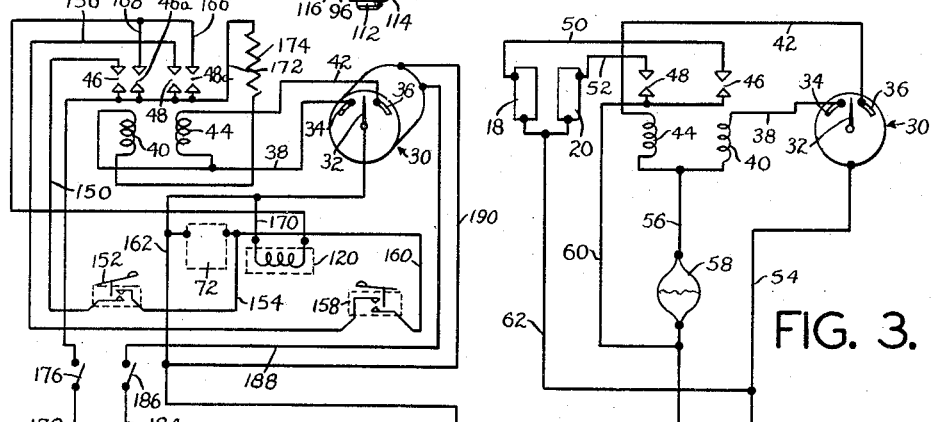
FIG. 3.
FIG. 4.
INVENTOR
JOHN J. ZOBER.
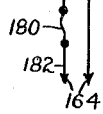
BY
ATTORNEY

United States Patent Office 2,862,168
Patented Nov. 25, 1958

2,862,168

AUTOMATIC RUDDER CONTROL FOR AIRCRAFT, SEA CRAFT AND THE LIKE

John J. Zober, Bayside, N. Y.

Application February 1, 1955, Serial No. 485,422

3 Claims. (Cl. 318—489)

This invention relates to an automatic rudder control for aircraft, sea craft and the like.

For purposes of illustration, the invention will be described and shown solely in relation to a light airplane of the type used in private flying but it will be understood that this is intended to be purely illustrative and that the invention applies equally as well to other types of aircraft and also to small boats such as motor boats and larger craft as well.

The principal object of this invention is the provision of a gyroscopic control for airplane rudders and the like. When a course is set, and unknown to the pilot, a deviation from said course takes place, the gyroscopic control will automatically react and it will swing the rudder in such direction as will oppose the deviation and the airplane will thereupon automatically resume its original course.

This feature is extremely useful particularly in blind flying when the pilot is not only unable to determine the direction in which he is proceeding, except by instruments, but is also unable to ascertain whether he is traveling in a straight or curved path and whether said path is at a constant elevation and further whether he is flying right-side-up or upside down or at any other angle relative to the horizontal. It is frequently the case, in situations such as these, that an airplane will go into a side slip without the pilot's knowledge until it is too late and the airplane will spiral to the ground completely out of control. It is an important feature of this invention, therefore, to provide automatic, gyroscopically controlled means for controlling the rudder of an airplane to prevent side slipping and spiraling.

The control element of this invention is a gyroscopic directional indicator which indicates the direction in which the plane veers off its course. Should it indicate that the plane is veering to the right, it would be necessary to correct the direction of travel by causing the plane to swing leftwardly and conversely should the indicator indicate veering to the left, it would be necessary to correct the situation by causing the plane to turn rightwardly. This gyroscopic directional indicator is connected to a rudder control apparatus which forms the heart of the present invention. In one form of this invention, said rudder control apparatus includes a reversible motor as its source of motive power. When the motor rotates in one direction, it causes the rudder control apparatus to turn the rudder in one direction. When the motor operates in the opposite direction, it causes the rudder control apparatus to turn the rudder in the opposite direction. The direction of rotation of the motor is controlled by the gyroscopic directional indicator.

In a second form of this invention, one or more solenoids are provided in the place and stead of the reversible motor. The rudder control apparatus includes a pivotally mounted rudder control bar which is connected to the rudder by means of cables. Consequently, when the rudder pivots from its neutral position, the rudder control bar will pivot in the same direction and to the same extent. The solenoids act directly upon said rudder control bar, one on each side of its pivotal axis. They are connected to the gyroscopic directional indicator in the same manner as the reversible motor and when the indicator moves in one direction, one of said solenoids is energized and when it moves in the opposite direction, the other solenoid is energized, and in this manner the rudder control bar is caused to swing in one direction or the other depending upon the direction of movement of the indicator.

Should it be desired to use only a single solenoid in place of the two solenoids above mentioned, said single solenoid would be provided with contacting means for engaging the rudder control bar on opposite sides of its pivotal axis so that irrespective of the angular position of said control bar, the action of the solenoid upon it would be to return it to neutral position. In this connection, it should be understood that the use of solenoids, like the use of a reversible motor, is purely illustrative of the invention and other power sources may be employed in their place and stead. For example, hydraulic means, such as hydraulic motors or hydraulically actuated plungers, may be employed in this invention.

An important feature of this invention is the fact that the rudder control bar is always free to be actuated by the conventional rudder control means with which airplanes and other craft are normally provided. For example, in small aircraft, the rudder is controlled by means of a pair of pedal members or manually controlled members or the like. These control members always remain connected to the rudder control bar, irrespective of whether the control apparatus herein claimed is energized and in operation or not. Consequently, the airplane is always subject to the control of the pilot and it is only when the pilot permits the apparatus herein claimed to control his craft that its influence is asserted.

The invention is illustrated in the accompanying drawing in which:

Fig. 1 is a plan view of a rudder control apparatus made in accordance with one form of this invention and showing the rudder control bar controlled by a pair of solenoids.

Fig. 2 is a sectional view through a rudder control apparatus made in accordance with a second form of this invention, the rudder control bar being controlled by means of a reversible motor.

Fig. 3 is a diagram of an electrical circuit for the apparatus shown in Fig. 1.

Fig. 4 is a diagram of an electrical circuit for the apparatus shown in Fig. 2.

Referring now to Fig. 1, it will be observed that a rudder control bar 10 is pivotally mounted on a pivot 12. A cable 14 is connected to one end of said control bar and also to one side of the rudder of an airplane in which the apparatus under discussion is installed. A second cable 16 is connected to the opposite end of said rudder control bar 10 and said second cable is connected to the opposite side of the rudder. Two solenoids 18 and 20 are provided with rollers 22 and 24 on their respective plungers or cores 26 and 28. It will hereinafter be seen in Fig. 3 that these two solenoids are connected to a gyroscopic directional indicator 30 and when said indicator swings in one direction, one of said solenoids will be energized and when it swings in the opposite direction, the other of said solenoids will be energized.

It will be understood from the foregoing that when the rudder turns in such direction as will cause the control bar to pivot in clockwise direction, solenoid 18 will be energized and it will act upon the control bar to swing it in counterclockwise direction until its neutral position is reached. By the same token, should the rudder swing in such direction as will cause the conrol bar to pivot in counterclockwise direction, solenoid 20 will be energized and it acts upon the control bar to swing it in clockwise direction and back to its neutral position. In either case, the conventional control mechanism which is connected to the rudder may be employed by the pilot to control the rudder irrespective of whether one or the other of the two solenoids is energized since the force which the pilot is capable of exerting upon the rudder control mechanism is ample to overcome the forces exerted by the solenoids.

Turning now to Fig. 3, it will be observed that the gyroscopic directional indicator is provided with an indicator proper or pointer 32 and a pair of contact members 34 and 36 respectively. In one form of this invention, there is a clearance of two degrees between each side of said indicator or pointer 32 and the adjacent contact member, when the indicator is in neutral position. This would permit a deviation of almost two degrees either leftwardly or rightwardly before the control apparatus herein claimed would go into operation. This, of course, is illustrative and greater or lesser spacing may be provided to increase or decrease the extent of deviation which would be permissible before the control apparatus would react.

Contact member 34 is connected by means of conductor 38 to a relay 40 and contact member 36 is connected by means of conductor 42 to a second relay 44. These relays control, respectively, switches 46 and 48. A conductor 50 connects switch 46 to soleniod 18 and a second conductor 52 connects switch 48 to solenoid 20. Gyroscopic indicator 30 is connected by means of conductor 54 to a source of current and the two relays are connected by means of conductor 56 to the same source of current, one of these conductors being positive and the other negative. A resistance 58 is thrown across conductor 56. A conductor 60 connects the two switches 46 and 48 to conductor 56 and a conductor 62 connects the two solenoids to conductor 54.

It will be observed from the foregoing, that when pointer 32 moves in clockwise direction into engagement with contact 36, relay 44 will be energized and switch 48 will be closed, thereby energizing solenoid 20 and causing said solenoid to act upon the control bar 10 to move it in clockwise direction. Conversely, when pointer 32 moves in counter-clockwise direction into engagement with contact 34, relay 40 will be energized to close switch 46 and to energize solenoid 18 and thereby to swing the control bar in counter-clockwise direction.

Turning now to Figs. 2 and 4, it will be seen that a control bar 70 is employed, corresponding to control bar 10 above mentioned. This control bar is pivotally mounted and it is connected at its ends to cables which are connected to the rudder. The motive power is supplied by a reversible motor 72 which is connected to a gear box 74. The gear box is supported by supports 76 on a case or housing 78. The lower ends of supports 76 are reduced and threaded to receive nuts 80. A base 82 is mounted on blocks 84 which are disposed upon the bottom wall of said casing 78 and it will be seen that the reduced ends of supports 76 extend through said base and blocks to lock them in place on said casing wall. Base 82 serves as a platform for the rudder control bar 70 as Fig. 2 clearly shows.

The rudder control bar 70 has a central hole 86 formed therein and base or platform 82 has a registering hole 88. Bushings 90 and 92 are provided in these two holes. It will be noted that a sleeve 94 projects into the two bushings 90 and 92 and within said sleeve is shaft 96 which projects downwardly from gear box 74. This is the main drive shaft of the mechanism. A key 98 secures sleeve 94 to shaft 96 so that said sleeve and shaft will rotate integrally with each other.

It will be observed that sleeve 94 has an annular flange 100 formed at its upper end. This annular flange rests upon the control bar 70 but it is free therefrom so that relative angular movement between said annular flange 100 and said control bar 70 is possible. Mounted on annular flange 100 is a clutch ring 102 and disposed upon said clutch ring is a toothed wheel 104. This toothed wheel is provided with an annular recess to receive a second clutch ring 106 and disposed above said second clutch ring is an annular cap 108. A pin 110 secures said annular cap to the drive shaft 96 so that they will rotate integrally with each other.

It will be noted that the lowermost end 112 of shaft 96 is reduced and threaded to receive a nut 114. Said nut supports a washer 116 and locks said washer against shaft 96. A compression spring 118 is mounted on shaft 96 between washer 116 and sleeve 94 and it will be understood that in one form of this invention said spring exerts a force of approximately 158 pounds. In other words, said spring is pre-loaded to the extent of 158 pounds and it is intended for application to a light single motored private or sports airplane such as a Piper Cub. Spring 118 is supported by washer 116 and it pushes upwardly against sleeve 94 to push said sleeve, and more particularly its clutch ring 102 which it supports, into engagement with toothed wheel 104. Although sleeve 94 is keyed to shaft 96, it is nonetheless relatively free to move longitudinally with respect to said shaft and consequently the force which said spring exerts upon said sleeve results in the upward pressure against the toothed wheel 104 above described. This results in pressure brought to bear by the second clutch ring 106 resting on the toothed wheel and cap 108 which is pinned to drive shaft 96.

The effect of the spring action above set forth is to clamp the toothed wheel 104 to the drive shaft 96 by means of a force of 158 pounds. Since this force is exerted adjacent the pivotal cetner of the entire apparatus herein claimed, it will be understood that a much smaller force exerted radially outwardly therefrom will offset this clamping force, should the need for opposing and overcoming said clamping force arise. It will be understood that such need does arise when the pilot desires to overcome the automatic action of the control mechanism herein claimed.

Thus far control bar 70 is free to pivot relative to the drive shaft 96 and the clamping members thereon since there is clearance between said control bar 70 on the one hand and platform 82 and flange 100 on the other hand. The means for coupling the drive mechanism to the control bar will now be described. Mounted on said control bar is a solenoid 120. Also mounted on said control bar and secured thereto by means of screws 122 is a housing 124. A bracket 126 of inverted L-shape is secured to the plunger 128 of solenoid 120. A second bracket 130 is secured to housing 124 and a spring 132 is connected at one end to said bracket 126 and at its opposite end to bracket 130, the action of said spring being to pull the plunger 128 in the direction away from the solenoid proper.

Pivotally mounted on housing 124 is a lever 134 and the upper end of said lever is pivotally secured to the upper end of bracket 126. The lower end of lever 134 is reduced to the form of a finger and said finger projects into a notch 136 in a slidably mounted bar 138. This bar is mounted for slidable longitudinal movement in housing 124 and it will be observed that its movement is radial of toothed wheel 104 and toward and away from said wheel. When the solenoid is energized, lever 134 is swung in clockwise direction and its lower end thrusts bar 138 leftwardly into engagement with the teeth of the toothed wheel 104. It will be seen that the wheel engaging end 140 of bar 124 is reduced to the form of a tooth which is engageable between the teeth of said toothed wheel 104.

When the solenoid 120 is energized and bar 138 is thrust into engagement with said toothed wheel 104, the control bar 70 is no longer free to move angularly relative to said toothed wheel and the spring clamping action which is exerted upon said toothed wheel, as above described, is now, in effect, exerted against the control bar. Should motor 72 now be caused to rotate in one direction, control bar 70 will pivot in one direction and should the motor be caused to rotate in the opposite direction, said bar will pivot in the opposite direction.

It will be understood from the foregoing, that control bar 70 is connected by means of cables to the rudder of the airplane and consequently when said control bar is caused to pivot in one direction or the other, such pivotal movement will be reflected in corresponding pivotal movement of the rudder. Should the pilot wish, however, to oppose such action by the control mechanism, he would operate the control pedals in the usual manner and this would overcome the 158 pound force which clamps the control bar to the drive shaft 96. A force of as little as 20 pounds will overcome the action of the control bar in the Piper Cub installation above mentioned as illustrative of this invention.

Referring now to the circuit diagram in Fig. 4, it will be observed that a gyroscopic direction indicator 30 is employed, precisely as in the first form of this invention. A conductor 38 connects contact member 34 to a relay 40 and a second conductor 42 connects contact 36 to a second relay 44. Relay 44 controls switches 48 and 48a. Relay 40 controls switches 46 and 46a. A conductor 150 connects switch 46 to a limit switch 152 and a conductor 154 connects said limit switch to reversible motor 72. Another conductor 156 connects switch 48 to a second limit switch 158 and a conductor 160 connects said second limit switch to a second terminal on motor 72. The opposite side of the motor is connected by means of conductor 162 to a source 164 of electric current. This same conductor 162 is connected to pointer 32 of the gyroscopic directional indicator 30.

It will be noted that a conductor 166 connects switch 48a to one side of solenoid 120. Another conductor 168 connects switch 46a to conductor 166 and thereby connects said switch 46a to one side of solenoid 120. A conductor 170 connects the opposite side of said solenoid to conductor 162 and thereby to a source of electric current.

A conductor 172 is connected to switches 46, 46a, 48 and 48a and at one end it is connected to a resistor 174 and at its opposite end to a manually controlled switch 176. Another conductor 178 connects said manually controlled switch to a fuse 180 and a conductor 182 connects said fuse to the opposite side of the source of electric current 164 from the side to which conductor 162 is connected. A conductor 184 connects another manually controlled switch 186 to conductor 178 and a conductor 188 connects said switch to the motor of gyroscopic directional indicator 30. A conductor 190 is connected to the opposite side of said last mentioned motor and to conductor 162.

The operation of this apparatus is now clear. When switches 176 and 186 are closed, gyroscopic directional indicator 30 is in operation and the control mechanism herein claimed is also ready to go into operation. Should pointer 32 swing in counter-clockwise direction into engagement with contact 34, relay 40 will be energized and switches 46 and 46a will be closed. This will cause motor 72 to operate in one direction and it will also cause solenoid 120 to be energized and to thrust bar 138 into engagement with the toothed wheel 104. This will cause the control bar 70 to pivot in one direction. Should it pivot too far in said direction, limit switch 152, which is normally closed, will open and the motor will thereby cease operating. Should pointer 32 swing in clockwise direction into engagement with contact 36, relay 44 will be energized and switches 48 and 48a will be closed, thereby energizing solenoid 120 and causing the motor 72 to operate in the opposite direction. This will cause the control bar 70 to pivot in the opposite direction and should it turn too far in such direction, switch 158, a normally closed switch, will open and the motor will cease operating.

The foregoing is illustrative of preferred forms of this invention and it will be understood that these preferred forms may be modified and other forms may be provided within the broad spirit of the invention and the broad scope of the claims.

What is claimed is:

1. A directional stabilizer for automatically controlling the rudder of aircraft, sea craft and the like, comprising a control bar which is pivotally mounted intermediate its ends and which is connected at one end to one side of a rudder and which is connected at its opposite end to the other side of said rudder, a slip clutch connected to said control bar, a reversible motor connected to said slip clutch, whereby rotation of said motor in one direction causes the control bar to pivot in one direction and whereby rotation of said motor in the opposite direction causes said control bar to pivot in the opposite direction, and a gyroscopic directional indicator having a directional pointer and a pair of contact members, one on one side of the pointer and the other on the opposite side of the pointer, said pointer and said contact members being electrically connected to said reversible motor, whereby movement of the pointer in one direction into engagement with one of said contact members closes a circuit to the motor and causes it to rotate in one direction and whereby movement of the pointer in the opposite direction into engagement with the second contact member closes a second circuit to the motor and causes the motor to rotate in the opposite direction.

2. A directional stabilizer in accordance with claim 1, wherein the slip clutch is spring loaded to a predetermined torque to enable the motor to exert a predetermined force upon the control bar to urge it to move pivotally in one direction or the other depending upon the direction of rotation of the motor.

3. A directional stabilizer in accordance with claim 1, wherein the motor is connected to a gear box and a shaft projects from the gear box and constitutes the drive shaft of the stabilizer, said control bar being mounted for pivotal movement about the axis of said drive shaft, said slip clutch being spring loaded and being mounted on said drive shaft and including a toothed wheel which is coaxial with said drive shaft, a bar slidably mounted on said control bar for movement longitudinally of itself and radially of said toothed wheel, and a solenoid mounted on said control bar and connected to said slidable bar, whereby energizing the solenoid causes it to thrust the slidable bar into engagement with the toothed wheel, whereby operation of the motor in either direction causes pivotal movement of the control bar in a corresponding direction through the instrumentality of said toothed wheel in engagement with said slidable bar.

References Cited in the file of this patent

UNITED STATES PATENTS

| | | |
|---|---|---|
| 1,047,827 | Monroe | Dec. 17, 1912 |
| 1,772,788 | Sperry | Aug. 12, 1930 |
| 2,152,144 | Minelli | Mar. 28, 1939 |
| 2,615,154 | Wade | Oct. 21, 1952 |